United States Patent
Argue et al.

(10) Patent No.: US 9,336,549 B2
(45) Date of Patent: May 10, 2016

(54) SYSTEMS AND METHODS FOR PERFORMING IN-STORE AND ONLINE TRANSACTIONS

(71) Applicant: Wal-Mart Stores, Inc., Bentonville, AR (US)

(72) Inventors: Stuart Argue, Palo Alto, CA (US); Anthony Emile Marcar, San Francisco, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 0 days.

(21) Appl. No.: 14/503,034

(22) Filed: Sep. 30, 2014

(65) Prior Publication Data

US 2016/0092970 A1 Mar. 31, 2016

(51) Int. Cl.
*G06K 5/00* (2006.01)
*G06Q 30/06* (2012.01)
*G06Q 10/08* (2012.01)

(52) U.S. Cl.
CPC .......... *G06Q 30/0635* (2013.01); *G06Q 10/087* (2013.01)

(58) Field of Classification Search
USPC ................ 235/382, 383; 705/14.23, 14.38
See application file for complete search history.

(56) References Cited

U.S. PATENT DOCUMENTS

| | | | | |
|---|---|---|---|---|
| 8,285,573 | B1 * | 10/2012 | Ballaro | G06Q 10/087 705/22 |
| 2012/0296770 | A1 * | 11/2012 | Lin | G06Q 30/0601 705/26.8 |
| 2013/0080289 | A1 * | 3/2013 | Roy | G06Q 30/06 705/26.8 |
| 2013/0097036 | A1 * | 4/2013 | Fisher | G06Q 20/20 705/18 |
| 2013/0134213 | A1 * | 5/2013 | Pallakoff | G06Q 30/00 235/375 |
| 2013/0173403 | A1 * | 7/2013 | Grigg | G06Q 20/20 705/16 |
| 2013/0185150 | A1 * | 7/2013 | Crum | G06Q 30/02 705/14.49 |

* cited by examiner

*Primary Examiner* — Ahshik Kim
(74) *Attorney, Agent, or Firm* — Howard & Howard Attorneys PLLC

(57) ABSTRACT

Items are added to a transaction on a user mobile device. In-store items may be added by scanning and on-line only items may be added to the transaction. Payment for the transaction may be invoked on the mobile device and processed in a single transaction. A verification code may be transmitted to the mobile device, scanned by an employee device, which uses the code to obtain a listing of the items of the transaction. The employee device sends verification to the server, which, in response, sends an electronic receipt to the mobile device. Recommendations for online products, including possible substitutions are provided. Where a desired quantity of an in-store item exceeds available inventory, an online order for the excess quantity may be added to the transaction.

18 Claims, 9 Drawing Sheets

SYSTEMS AND METHODS FOR PERFORMING IN-STORE AND ONLINE TRANSACTIONS

BACKGROUND

1. Field of the Invention

This invention relates to systems and methods for conducting transactions.

2. Background of the Invention

A retailer operating a physical retail location makes every effort to meets the needs of the customer and supply the goods desired by a customer. Mailings and online advertisements for products in a store are one method that a retailer may use to get a customer to a store. In the store, displays, product demonstrations, or other techniques may be used to increase sales to a customer. In some approaches, purchases of a particular user in a store may be used to generate targeted marketing, such as by way of a loyalty program that associated a user's purchases with an account.

The systems and methods disclosed herein provide an improved approach for marketing products to a consumer and increasing the number of products available to a customer by a retailer operating a physical retail establishment

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
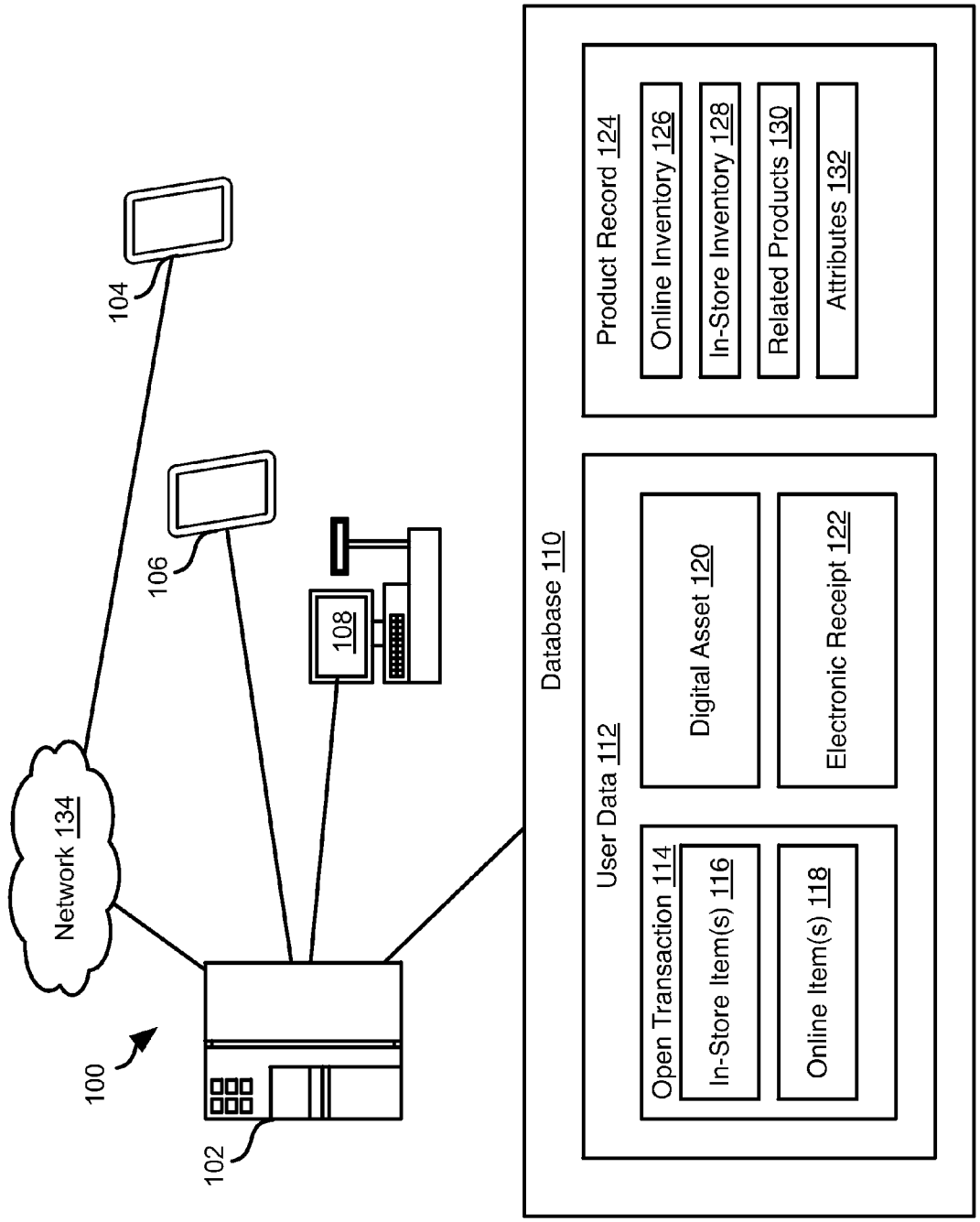
FIG. 1 is a schematic block diagram of a network environment in which methods in accordance with embodiments of the present invention may be performed.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Items are added to a transaction on a user mobile device. In-store items may be added by scanning and on-line only items may be added to the transaction. Payment for the transaction may be invoked on the mobile device and processed in a single transaction. A verification code may be transmitted to the mobile device, scanned by an employee device, which uses the code to obtain a listing of the items of the transaction. The employee device sends verification to the server, which, in response, sends an electronic receipt to the mobile device. Recommendations for online products, including possible substitutions are provided. Where a desired quantity of an in-store item exceeds available inventory, an online order for the excess quantity may be added to the transaction.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a non-transitory computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

FIG. 1 illustrates a system 100 in which methods described hereinbelow may be implemented. The system 100 may include a server system 102. The server system 102 may include one or more server computer systems and may be an ecommerce server providing access to a website providing navigation of a product database and conducting electronic transactions for products. The server system 102 may also store and access a product database for a retail store and perform inventor management functions as well as set prices for products offered for sale at one or more retail establishments. In some embodiments, methods for conducting transactions as disclosed herein may be performed by the server system 102. Separate server systems 102 may perform the inventory management and ecommerce functions whereas another server system 102 performs conducts transactions according to the methods disclosed herein.

The server system 102 may interact with a plurality of mobile devices 104 used by users at a retail establishment. The server system 102 may likewise interact with one or more employee devices 106 that may also be embodied as laptop, desktop, or other computer. The mobile devices 204 and employee devices 106 may also be smart phones, tablet computers, wearable computing devices, or the like. In some embodiments, the functionality attributed herein to the employee device 106 may be implemented by a point of sale (POS) 108, i.e. cash register that is capable of receiving input of item identifiers such as by scanning bar codes, processing cash or electronic payment, and reporting concluded transactions as implemented by various POS systems known in the art.

The server system 102 may host or access a database 110. The database 110 may store user data 112 generated or used according to the methods described hereinbelow. User data 112 may be data associated with a user account associated with an individual or entity. Accordingly, access to the user data 112 may require authentication of a user or device attempting to read from or write to the user data 112.

The methods disclosed describe various approaches for adding items to transactions and conducting transactions. Accordingly, user data 112 may include one or more open transactions 114 created by a user or a user mobile device 104 of a user. In particular, as described in greater detail below, an open transaction 114 may include identifiers of in-store items 116 and/or online items 118 added to the instruction in response to user instructions received on the mobile device 104.

As also described in greater detail below, one or more digital assets (e.g. audio files, video files, games, digital currency, software, or access to any such assets) may be associated with a user account. Accordingly, the user data 112 of a user account may include one or more such digital assets. Likewise, electronic receipts 122 may be stored by the server system 102 in the user data 112 for concluded transactions according to the methods disclosed or conducted at a POS 108 in a conventional manner or records of online transactions and conducted in the context of the user account.

In some embodiments, the database 110 may store various product records 124 each corresponding to a product identifier. Information for a product identifier may include one or both of online inventory 126 available for fulfilling orders for the product identifier and in-store inventory 128 of units of the product identifier at one or more physical retail establishments. In particular, in-store inventory 128 may record for each of one or more retail establishments, a number of units corresponding to a product at the each retail establishment. In-store inventory 128 may record such information as units on shelves or otherwise available for immediate pickup at the each retail establishment and/or a number of units in storage or otherwise available for pick up upon request with a reasonable amount of delay, i.e. within 24 hours or within an hour from being requested by a customer.

The product record 124 may further include such information as related products 130. Related products may include products that are used with the product identified by the product record 124 or that are alternatives to the product. In particular, related products may be products that are frequently bought in the same transaction as the product identified by the product record 124. Related products 130 may be identified according to classification of the product of the product record 124 and related products in a taxonomy or according to consumer behavior (i.e. co-purchasing) or relating to a same consumer interest or preference. Related products 130 may be identified for a product record 124 according to any method for characterizing consumer interests and behavior known in the art.

The product record 124 may include one or more attributes 132 of a product of the product record 124. In particular, attributes such as size, features, functionality, and the like. In particular, where a product has an attribute for which a range of other attributes may be embodied in other products, such an attribute may be included in the product record. For example, for clothing, an article of a given design may be available in various sizes. Accordingly, such an attribute 132 of a product record 124 may be used according to methods described herein to provide substitutes or alternatives for a unit of a product of the product record 124.

The mobile device 104 may communicate with the server system 102 by means of a network 134. The network 134 may include some or all of a local area network (LAN), wide area network (WAN), or the Internet. The network 134 may include one or both of wired and wireless connections. Likewise, the POS 108 and employee device 106 may communicate with the server system 102 and/or mobile device 104 by means of any of the above-listed networks.

Figure 2:
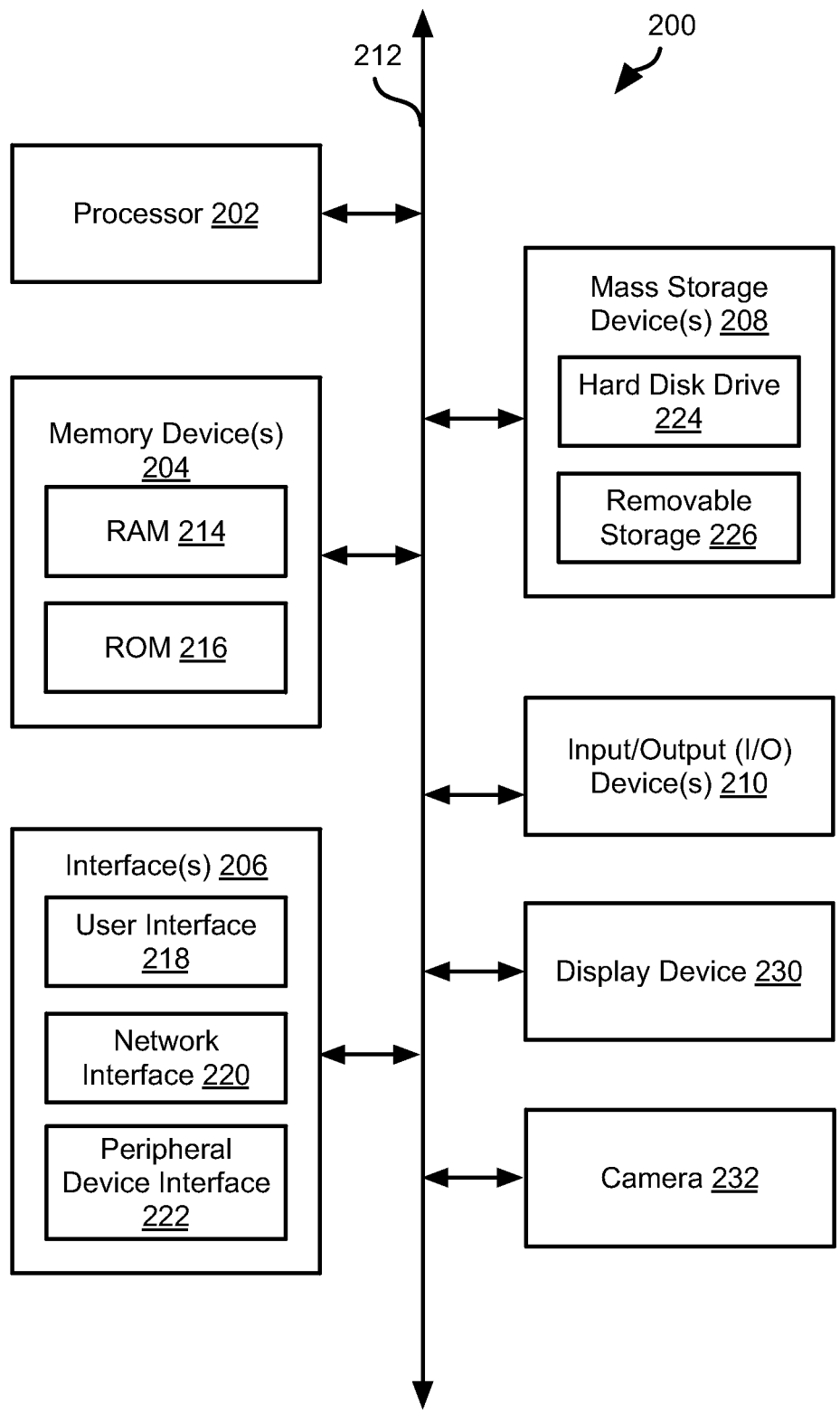
FIG. 2 is a block diagram of a computing device suitable for implementing embodiments of the present invention.

FIG. 2 is a block diagram illustrating an example computing device 200. Computing device 200 may be used to perform various procedures, such as those discussed herein. A server system 102, mobile device 104, employee device 106, or POS 108 may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200 includes one or more processor(s) 202, one or more memory device(s) 204, one or more interface(s) 206, one or more mass storage device(s) 208, one or more Input/Output (I/O) device(s) 210, a display device 230, and a camera 232 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3A:
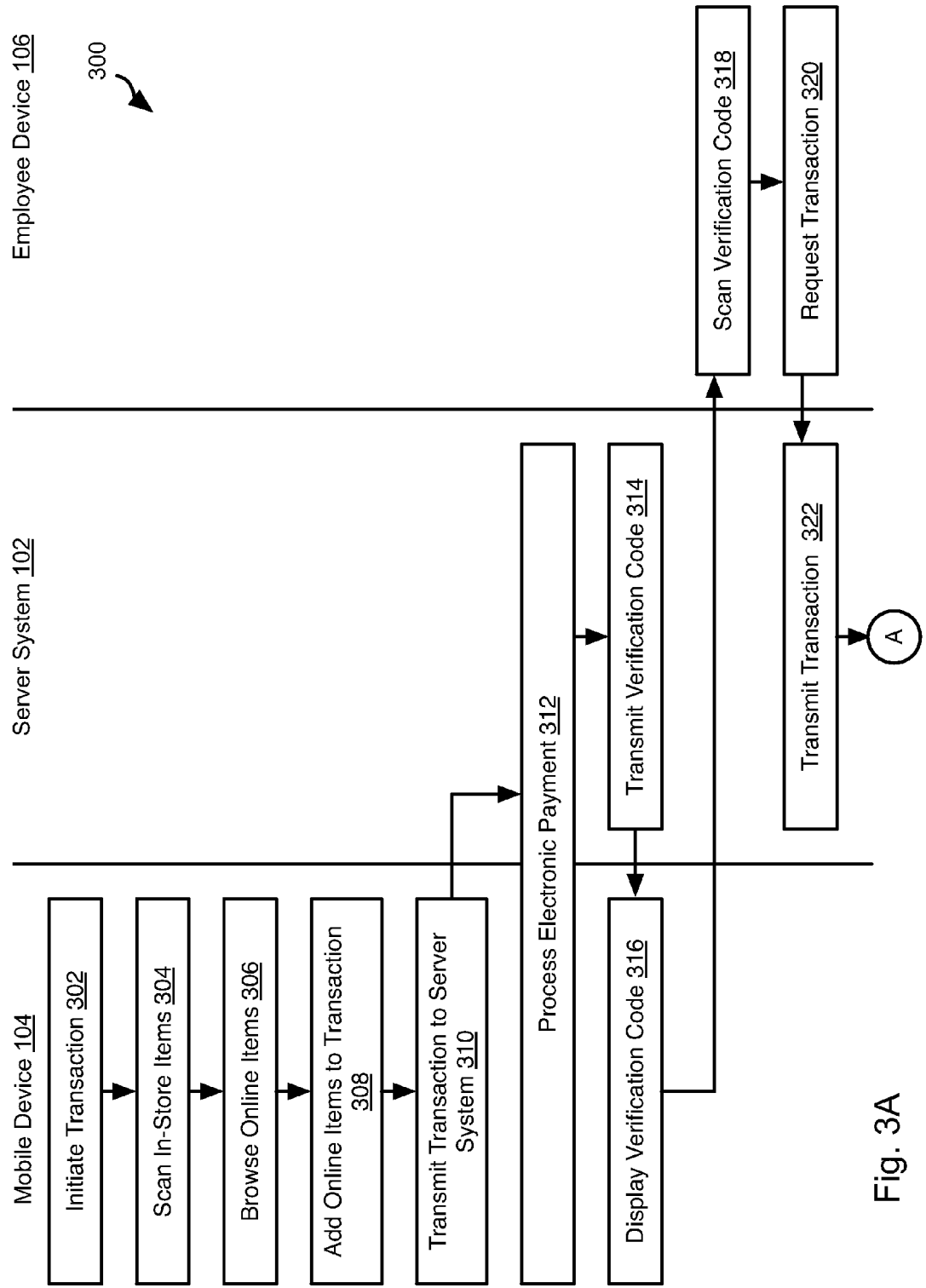
FIGS. 3A and 3B are a process flow diagram of a method conducting a transaction in accordance with an embodiment of the present invention.

FIG. 3A illustrates a method 300 for conducting a transaction. The method 300 may include initiating 302 a transaction by a mobile device 104. For example, a user may invoke initiation of a transaction by opening an application on the mobile device 104, providing authentication for authorizing access to the user data 112 of the user (which may be performed automatically by the application after an initial login), and providing an input indicating an intent to create a new transaction or otherwise add items to a transaction. In some embodiments, upon initiation 302 of the transaction, the mobile device 104 may transmit a notification to the server system 102 which may verify that stored electronic payment information for the user is current, i.e. perform a "zero authorization" for a credit card of a user.

The mobile device 104 may then scan 304 one or more in-store items. For example, the mobile device 104 may receive an instruction to scan or take a photograph. In response, the mobile device 104 scans or takes a photograph, such as using the camera 232. An image received by the camera 232 or some other scanning device may then be analyzed by the mobile device 104 to extract a product identifier, such as from a universal product code (UPC), quick response (QR) code, textual product name, or some other optically detectable symbol that can be decoded to obtain the product identifier of a product in the field of view of the camera 232 upon scanning 304. Product identifiers obtained by scanning 304 may be added to the transaction initiated at step 302.

The method 300 may further include browsing 306 by the mobile device 104 an online product catalog. Browsing 306 may include any browsing functionality conventionally associated with a browser including requesting web pages from a web server operated by the server system 102 or some other entity, receiving web pages, and rendering these web pages on the mobile device. The web pages may include information from a product record and include interface elements for invoking display of additional information, navigating to other product records, and adding a product identifier for the product record to the transaction.

The method 300 may further include adding 308 online items to the transaction. For purpose of this disclosure, an in-store items is an item located in the retail establishment in which the mobile device 104 executing the method 104 is located whereas online items are items that are not located in the retail establishment and that require shipping by a carrier or other shipping facility in order to reach the user or the retail establishment where the mobile device 104 is located. In particular, an online item may be one that is not scanned by the mobile device itself or that is not inspected by an employee prior to the user and mobile device exiting the retail establishment as described below. Adding 308 an online item may include receiving a shipping method (e.g. address, carrier, rate), in-store pick up, or some other shipping method.

In some embodiments, one or more additional online items may be part of bundle offered with the sale of an in-store product. In such instances, the one or more additional online items may be added to the order. Where the online items are included in the purchase price of the in-store product with which they are bundled, the purchase price for the bundled online items may be recorded in a transaction record as zero or as already paid. For example, upon purchasing of a gaming system, one or more games available for online purchase but not in-store may be added to the transaction either for shipping as a physical medium or downloading as a digital asset according to the method 500 of FIG. 5.

The method 300 may include transmitting 310 the transaction to the server. Transmitting 310 the transaction may include transmitting the identifiers of items added to the transaction by scanning 304 or online items added at step 308. Items identifiers may be transmitted 310 as they are scanned 304 or otherwise added 308 or may be transmitted by the mobile device 104 upon receiving a user input indicating that the user is ready to conclude the transaction. Transmitting 310 the transaction may include transmitting other information such as an identifier or location of the retail establishment and an identifier of the user account for which the mobile device 104 is authenticated.

In response to receiving the transaction, the server system 102 may cooperate with the mobile device 104 to process 312 electronic payment. In particular, a single payment may be processed for both the in-store items scanned 304 and online items added at step 308. For example, a server system 102 may have a credit card or other payment information already stored in an account of a user with which the mobile device 104 is authenticated. Accordingly, processing 312 electronic payment may include receiving an input on the mobile device 104 instructing payment, transmitting a request to make payment for the transaction by the mobile device 104 to the server system 102. In response, the server system 102 may use the stored electronic payment information to process an electronic payment for the purchase prices associated with the item identifiers of the transaction, including any taxes or other costs associated with the transaction.

In other embodiments, the instruction to make payment may invoke transmission of electronic payment information from the mobile device 104 to the server system 102, which then, in response, processes electronic payment for the transaction. In response to successful processing of payment, the server system 102 may transmit a verification code 314 to the mobile device 104. The verification 104 may be any unique code. For example, verification codes may be generated such that each verification code is unique to a transaction or is unique to each currently open transaction, i.e. initiated 302 but not concluded according to the method 300, including subsequent steps described herein.

Upon receiving the verification code, the mobile device 104 may display 316 the verification code. The code may be displayed as received, i.e. as alphanumeric symbols included in the verification code. The verification code may define a UPC, QR, or other optical code or may be transformed on the mobile device 104 into such a code and displayed 316 on the mobile device 104.

The verification code may then be scanned 318 by the employee device 106 or otherwise input to the employee device. Scanning 318 may include taking a picture of the verification code as displayed on the mobile device 104. In some embodiments, communication of the verification code from the mobile device 104 to the employee device 106 may include communication of the verification code by near field communication (NFC), wireless communication (e.g. Bluetooth™ proximity), or any other communication means.

In response to scanning the verification code, the employee device 106 may request 320 the transaction, i.e. the transaction initiated at step 302 form the server system 102. Alternatively, the verification code may encode some or all of the data of the transaction such that requesting of the transaction is not performed. The server system 102 may then transmit 322 some or all of the data of the transaction to the employee device 106. Transmitting 322 may include transmitting identifiers of the items scanned 304 or added 308 to the transaction to the employee device 106. The item identifiers may be ordered to place critical items at the top of the list of items as described below with respect to FIG. 8.

Figure 3B:
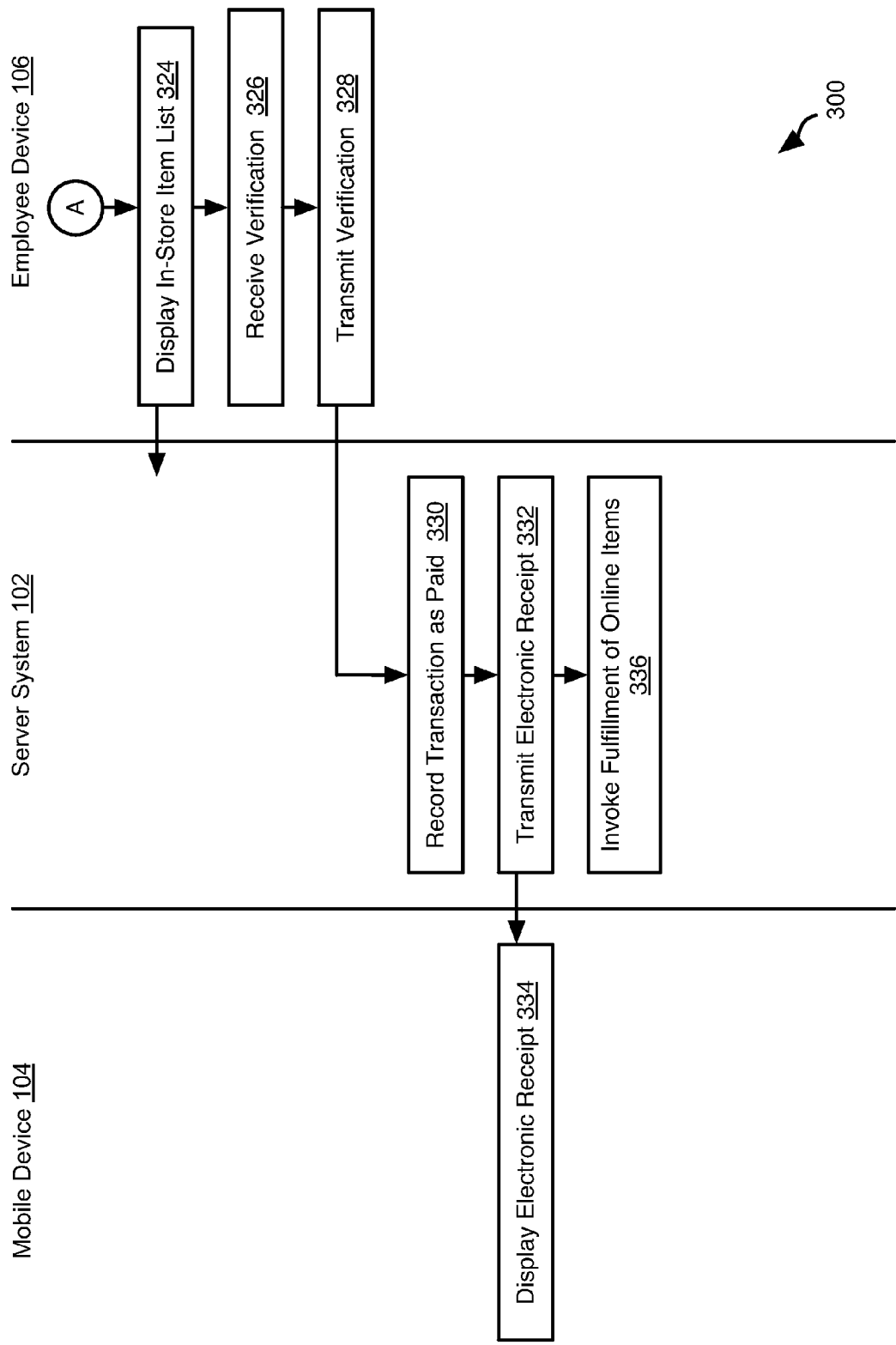

Continuing to FIG. 3B, in response receiving the transaction as transmitted, the employee device 106 may displayed 324 on the employee device 106. An employee may then review items a customer is seeking to remove from the store in hand, basket, or cart, and determine whether these items match the item identifiers in the transaction received. If the items carried by the customer match the item identifiers listed, the employee may input an instruction to the employee device indicating this fact. The employee device 106 receives 326 this verification instruction and in response to receiving this instruction, the employee device 106 may transmit 328 notification of verification of the transaction to the server system 102.

In response to receiving the notification of verification, the server system 102 may record 330 the transaction as paid, such as in a record of the transaction in the user data 110 of the user account in the context of which the method 300 is performed. Also in response to receiving the notification of verification, the server system 102 may transmit 332 an electronic receipt to the mobile device 104. The electronic receipt may be message indicating that the transaction has been paid for and may include other information, such as a list of the items paid for in the transaction, an expected shipping date for the online items added at step 308, or other information. Some or all of the information of the electronic receipt may then be displayed 334, or stored for later display, on the mobile device 104, thereby indicating to the customer that he/she is free to leave with the in-store items.

The server system 102 may also, in response to receiving verification, invoke 336 fulfillment of one or more orders for the online items added at step 308. Specifically, a fulfillment center, representative, or other party may be notified of the item identifiers, shipping address of the customer, and the like.

If verification is not transmitted 328 from the employee device 106, then the method 300 may include refraining from performing steps 330-336.

Figure 4:
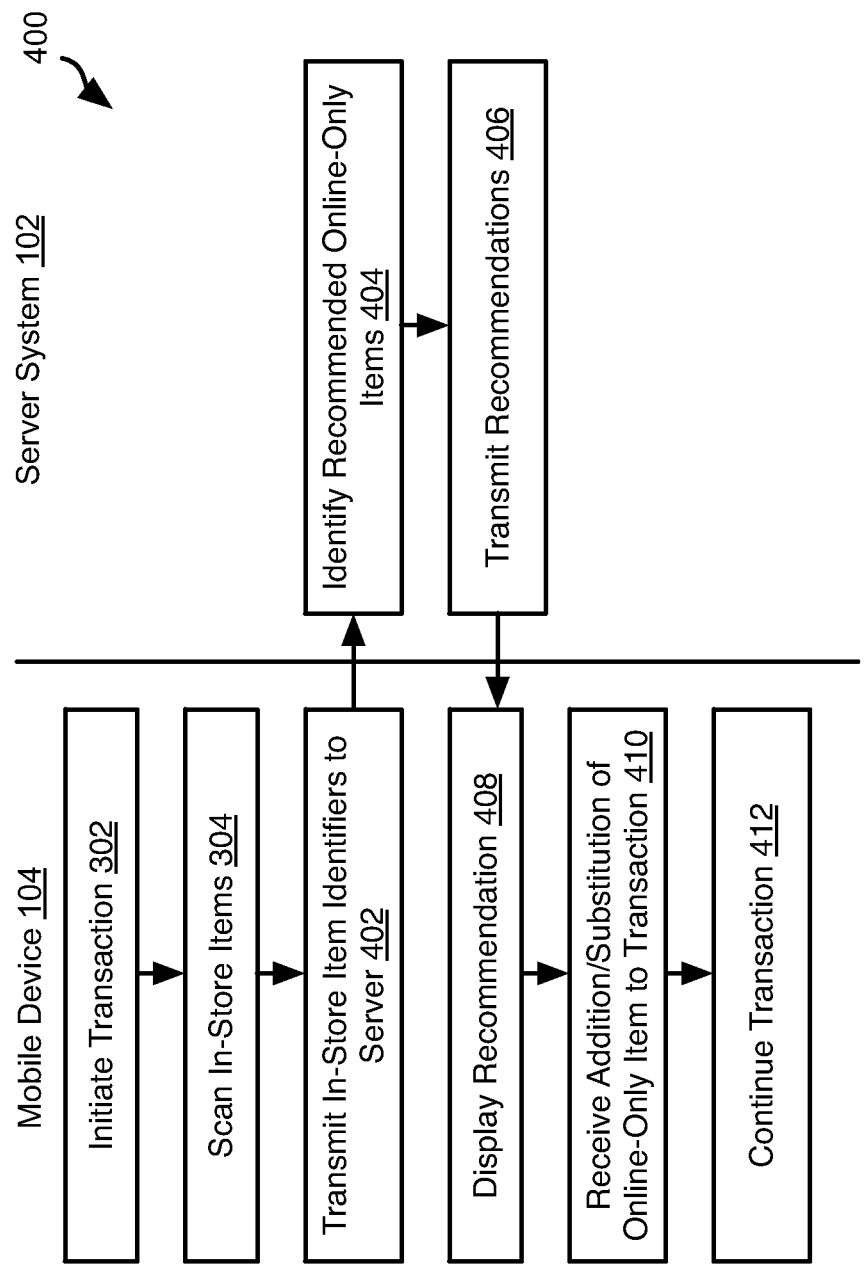
FIG. 4 is a process flow diagram of a method providing recommendations in accordance with an embodiment of the present invention.

FIG. 4 illustrates an alternative method 400 for defining and conducting a transaction. The method 400 may include initiating 302 a transaction and scanning 304 in-store items as described above. In response to scanning 304 of in-store items and the transmitting 402 of the item identifiers to the server system 102, the server system 102 may evaluate the item identifiers and identify 404 recommended and/or substitute items. For example, for an item of clothing, item identifiers for the same article of clothing in one or more different sizes may be identified. In another example, for an item identifier transmitted 402, other products that may be used with the product corresponding to the item identifier may be identified 404 based on purchase in the same transaction or by the same customer as the product of the transmitted 402 product identifier. Recommended products identified 404 may be products that are related to the same activity or interest to which the transmitted 402 product identifier corresponds. The method by which the recommended items are identified may include any method known in the art. Some or all recommended items may have a promotion or discount assigned thereto, e.g. "if you buy [online item A] with your purchase of [in-store item B] you will receive X % off your purchase." Promotions assigned may be associated with online items added to the transaction and used to determine the purchase price for the online items when processing payment.

The item identifiers of the identified 404 recommended products may then be transmitted 406 to the mobile device 104 and displayed 408 on the mobile device 104, which may include transmitting promotions or discounts for the recommended items. The recommended products may include online items as defined herein and, in some embodiments, may include exclusively online items. The method 400 may include receiving 410 the addition of one or more online-only items to the transaction or the substitution of an online-only item. For example, where a first item scanned at step 304 is an article of clothing, for example, the first item may be substituted 410 for a second, online-only item that is a different size form the first item but is otherwise the same article of clothing. The steps 304-410 may individually or collectively be performed repeatedly and in or out of order or in the order listed.

The method 400 may continue 412 the transaction for the items scanned 304 and added/substituted 410. Continuing 412 the transaction may include performing some or all of steps 310-336 as described above.

Figure 5:
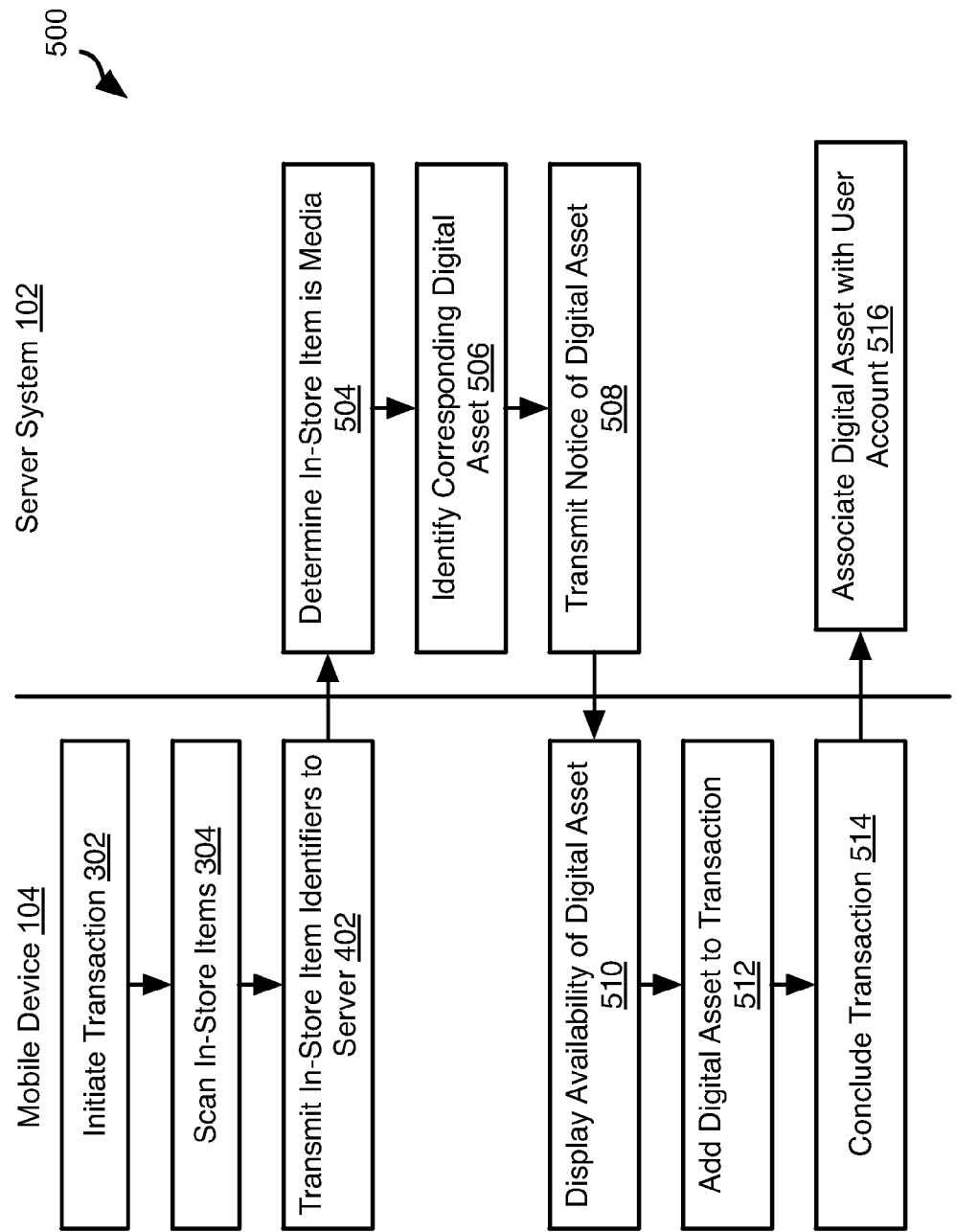
FIG. 5 is a process flow diagram of a method providing digital asserts in combination with an in-store transaction in accordance with an embodiment of the present invention.

FIG. 5 illustrated a method 500 including steps that may additionally or alternatively be performed for defining and conducting a transaction. The method 500 may include initiating 302 a transaction, scanning 304 in-store items, and transmitting 402 in-store item identifiers to the server system 102, such as in the same manner as described hereinabove.

The method 500 may include determining 504 that one or more of the in-store items scanned at step 304 is a media item, such as a compact disk (CD), DVD, Blu-Ray™ disk, or some other media format. In response to determining 504 that one or more of the in-store items scanned at step 304 are media, a corresponding digital asset may be identified. For example, where the item is a CD, a digital audio files, e.g. MP3 files, of the tracks recorded on the CD may be identified 506 as the corresponding digital asset. Likewise, where the item is a DVD, or Blu-Ray disk, the identified digital asset may be a video file corresponding to the movie or other content stored on the disk.

The method 500 may further include, in response to determining 504 that one or more in-store items are media and identifying 506 the one or more corresponding digital assets, transmitting 508 notice of availability of one or more digital assets to the mobile device 104. The mobile device 104 may display a message indicating availability of the one or more digital assets and provide an interface for adding the one or more digital assets to the transaction. The one or more digital assets 512 or one or more other online items may be added to the transaction, such as in response to a user instruction received on the mobile device 104 indicating that the user desires to purchase one or more of the digital assets and any other online items. For example, a user may select a representation of a digital asset in an interface or otherwise indicate an intent to add the digital asset to the transaction. In some embodiments, a digital asset may be included in the purchase of an in-store media corresponding to the digital asset. Accordingly, the digital asset may be added, but not add cost to the transaction.

The transaction may then be concluded 514, which may include performing some or all of steps 310-336 as described above. In response to concluding of the transaction, the server system 102 may additionally associated 516 the one or more digital assets added 512 to the transaction with an account in the context of which the method 500 is performed. Associating the digital asset may include associating data or a license with the account of the user indicating authorization of the user to access the digital asset or actually storing a digital copy of the asset in the account of the user. Where a license granted, in later processing the mobile device 104 or other device authenticated with the account of the user may request a copy of the digital asset from the server system 102 or some other repository and present the license. The repository may verify the license and, in response, transmit the digital asset to the mobile device 104 or other device.

In some embodiments, in response to determining that the in-store item is not media or that there is not a corresponding digital asset, the method 500 may include refraining from performing steps 508-512 and 516.

In some embodiments, digital assets may be identified 506 for in-store items other than media. For example, an item may be a tool or piece of equipment for which a corresponding training video exists and may be identified 506 as the corresponding digital asset 506. The method 500 may then continue with respect to the training video as the digital asset. In some embodiments, a digital asset may be included in the account of the user (step 526) without regard to whether the digital asset is added to the transaction.

Figure 6:
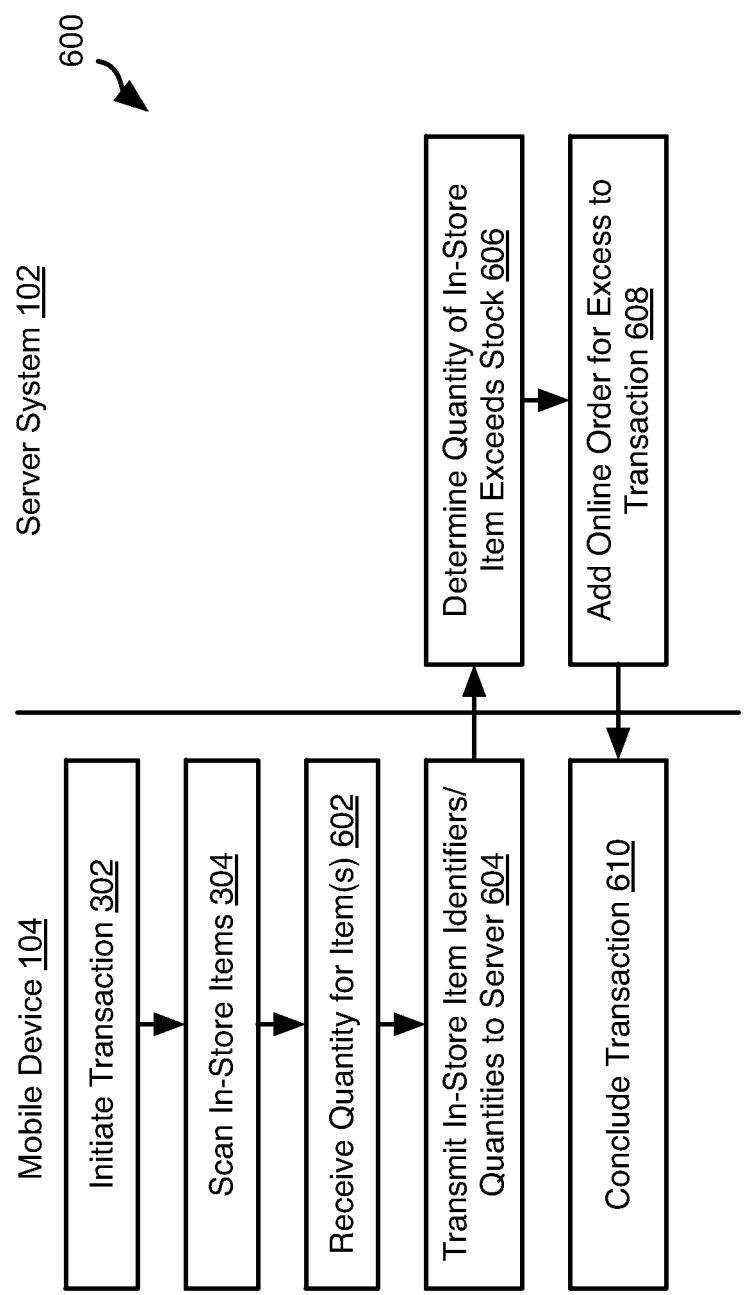
FIG. 6 is a process flow diagram of a method providing a desired quantity of an item regardless of in-store availability in-store transaction in accordance with an embodiment of the present invention.

FIG. 6 illustrates a method 600 that includes steps that may be performed alternatively or additionally to the steps of the other methods described herein. The method 600 may include initiating 302 a transaction, scanning 304 in-store items, such as in the same manner as described hereinabove. In some embodiments, a quantity may be received 602. For example, following scanning 304 of an item, an interface element, e.g. slider or input field may be displayed on the mobile device 104. A quantity may then be received by the mobile device 104 according to interaction with interface element or the quantity may default to one if no quantity is received.

The method 600 may include transmitting 604 by the mobile device 104 item identifiers for one or more of the scanned 304 items and their corresponding quantities 602 (e.g. quantities if other than one) to the server system 102. The server system may determine 606 that a quantity specified for one or more of the in-store items exceeds in-store stock. For each item for which the desired quantity exceeds the in-store stock for the each item, an excess quantity (desired quantity minus in-store stock quantity) of the each item may be added 608 to the transaction as an online order for the excess quantity. The transaction may then be concluded 610, which may include performing some or all of steps 310-336 as described above.

Figure 7:
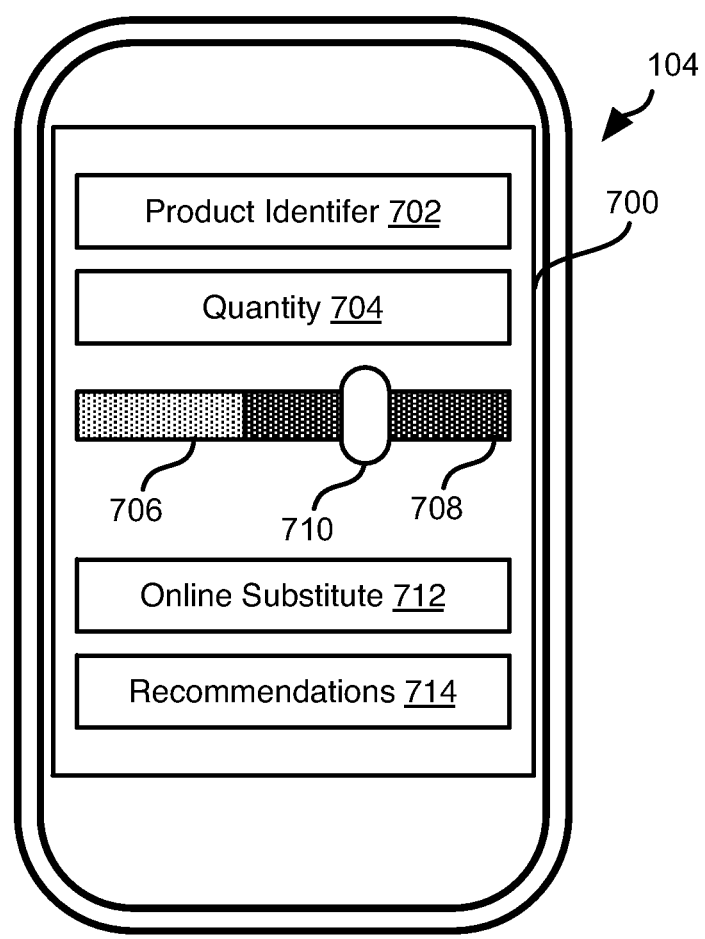
FIG. 7 illustrates an example interface for performing methods in accordance with an embodiment of the present invention.

FIG. 7 illustrates an example interface 700 that may be displayed by the mobile device 104. For example, the interface 700 illustrates user interface elements, some or all of which may be displayed following scanning of an in-store item as described above or upon selection of an in-store item from a list of items added to a transaction as described above. For example, the method 700 may include a product identifier 702, a quantity field 704 that may display a quantity and/or provide an input field for receiving a quantity. The interface 700 may further include a slider 710 that is positioned along an interface element including one or both portions 706, 708. For example, one portion 706 may indicate a fraction or portion of the quantity that is available in stock and a second portion 708 that indicates a fraction of the value in the quantity field that is not available in stock. A user may interact with the slider 710 to, for example, reduce the value of the quantity field 704 to the amount available in stock. The portions 706, 708 may be marked to indicate quantity.

The interface 700 may further include an interface element 712 one or both of listing substitutes for the product identifier 702 and invoking, in response to interaction by the user, an interface for selecting a substitute product for the product identifier 702.

The interface 700 may further include an interface element 714 one or both of listing recommendations generated according to methods described herein and invoking, in response to interaction by the user, addition of a recommended product to the transaction according to the methods described herein.

Figure 8:
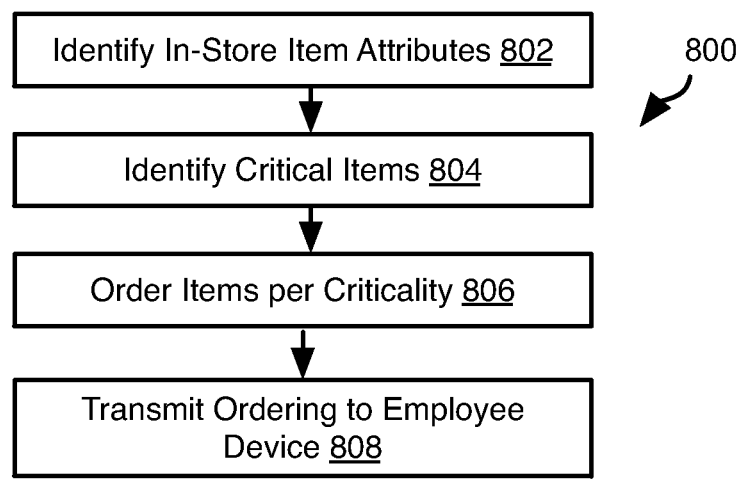
FIG. 8 is a process flow diagram of a method for performing employee verification of a transaction in accordance with an embodiment of the present invention.

FIG. 8 illustrated a method 800 that may be used to order the items of a transaction as transmitted to the employee device 106, such as at step 322 of the method 300. The method 800 may include identifying 802 one or more attributes of each in-store item of some or all of the in-store items added to a transaction. Critical items may be identified 804 according to the item attributes. In some instances and/or embodiments, a product record for an item identifier may simply identify the item as critical. In other instances and/or embodiments, whether an item is critical is determined based on the identified attributes. For example, a cost of an item may be compared to a cost threshold, a shrinkage rage (e.g. rate of theft) of the item may be compared to a threshold shrinkage rate, and a size of the item may be compared to a size threshold. If some or all of these threshold conditions are met (e.g. cost above a coast threshold, shrinkage rate above the threshold shrinkage rate, or size below a size threshold) then an item may be identified 804 as critical. Alternatively, a combination of these thresholds may be used, for example a criticality score for an item may be a sum or weighted sum of amounts by which the attributes of the item are exceed a maximum threshold (e.g., cost, shrinkage) or fall below a minimum threshold (e.g. size).

The method 800 may include ordering 806 items of the transaction according to criticality. A criticality score above a criticality score threshold may be deemed critical. And those items deemed critical may be placed at the top of the ordering. Other items may be listed alphabetically, according to price or order added to the transaction, or some other criteria. Alternatively, items may be ordered according to criticality scores such that the higher the score of an item the higher it will be in the ordering of items in the transaction.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method comprising:
receiving, by a server system, from a mobile computing device a message listing identifiers of one or more in-store items and one or more online purchase items;
processing, by the server system, a single payment of a total of the purchase prices associated with the identifiers;
transmitting, by the server system, a verification code to the mobile computing device, the verification code indicating payment for the one or more in-store items;
invoking, by the server system, fulfillment of an order for the online purchase items;
receiving, by the server system, a verification message from an employee device, the verification message referencing the verification code; and
in response to receiving the verification message, transmitting, by the server system, an electronic receipt to the mobile computing device.

2. The method of claim 1, further comprising:
receiving, by the server system, a message from the employee device indicating input of the verification code to the employee device;
in response to receiving the message from the employee device indicating receiving of the verification code to the employee device, transmitting, by the server system, a message listing the one or more in-store items.

3. The method of claim 2, wherein the one or more in-store items are a plurality of in-store items, the method further comprising:
identifying, by the server system, a portion of the plurality of in-store items, as critical items;
wherein transmitting, by the server system, the message listing the one or more in-store items in response to receiving the message from the employee device indicating input of the verification code to the employee device further comprises transmitting an ordering of the plurality of in-store items having the critical items listed first.

4. The method of claim 3, wherein identifying, the portion of the plurality of in-store items as critical items comprises identifying the portion as having one of a price above a first threshold, a shrinkage rate above a second threshold, and belonging to a high-theft class of products.

5. The method of claim 1, further comprising:
evaluating, by the server system a record associated with the one or more in-store items in database;
determining, by the server system, that the records associated with a portion of the one or more in-store items each have a digital asset associated therewith;
in response to determining that the records associated with the portion of the one or more in-store items each have a digital asset associated therewith, associating authorization to download the digital asset with an account associated with the mobile computing device.

6. The method of claim 5, wherein the portion of the one or more in-store items are media storing content and the digital asset associated with each item of the portion of the in-store items is a digital copy of the content stored on the each item.

7. The method of claim 1, further comprising:
receiving, by the server system, a desired quantity for a first item of the one or more in-store items from the mobile device
comparing, by the server system, the desired quantity for the first item to an in-stock quantity of the first item;
determining, by the server system, that the desired quantity exceeds the in-stock quantity of the first item; wherein in response to determining that the first desired quantity exceeds the in-stock quantity, generating, by the server system, an online order for a difference quantity of the first item, the difference quantity being equal to a difference between the desired quantity and the in-store quantity;

wherein processing, by the server system, the single payment of a total of the purchase prices associated with the identifiers comprises processing payment for the online order for the difference quantity of the first item.

8. A method comprising:

receiving, by a mobile computing device, an instruction to add an in-store item to a transaction, the in-store item being an item offered for sale in retail establishment in which the mobile computing device is located at the time of receiving the instruction to add the in-store item to the transaction;

receiving, by the mobile computing device, an instruction to add an online item to the transaction including the in-store, the online item being an item not located at the retail establishment at the time of receiving the instruction to add the online item to the transaction;

receiving, by the mobile computing device, an instruction to submit payment for the transaction;

in response to receiving the instruction to submit payment for the transaction, interacting, by the mobile computing device, with a server system to process a single electronic payment for both of the online item and in-store item;

receiving, by the mobile computing device, a verification code indicating payment for the in-store item;

outputting, by the mobile computing device, a representation of the verification code while the mobile device is located at the retail establishment;

receiving, by the mobile computing device, an electronic receipt for the in-store item;

receiving, by the server system, a verification message from an employee device, the verification message referencing the verification code; and in response to receiving the verification message, transmitting, by the server system, an electronic receipt to the mobile computing device.

9. The method of claim 8, wherein the in-store item is media storing content and the digital asset associated with each item of the portion of the in-store items is a digital copy of the content stored on the each item.

10. The method of claim 9, wherein receiving, by the mobile computing device, the instruction to add the online item to the transaction including the in-store item comprises:

receiving, on the mobile computing device, an interface referencing the digital copy of the content in response to receiving the instruction to add the in-store item; and receiving, on the mobile computing device, an interaction with the interface indicating an instruction to add the digital copy to the transaction.

11. The method of claim 8, further comprising:

receiving, by the mobile computing device, a desired quantity for the in-store item;

receiving, by the mobile computing device, a message from the server system indicating that the desired quantity for the in-store item exceeds an in-store quantity of the in-store item at the retail establishment at the time of receiving the instruction to add the in-store item to the transaction; and displaying, by the mobile computing device, an interface including an interface element indicating an instruction to add an online order for a difference quantity of the in-store item equal to a difference between the desired quantity and the in-store quantity to the transaction;

wherein receiving the instruction to add the online item to the transaction comprises receiving an interaction with the interface.

12. A system comprising one or more processors and one or more memory devices storing executable and operational data effective to cause the one or more processors to:

receive from a mobile computing device a message listing identifiers of one or more in-store items and one or more online purchase items;

process a single payment of a total of the purchase prices associated with the identifiers;

transmit a verification code to the mobile computing device, the verification code indicating payment for the one or more in-store items;

invoke fulfillment of an order for the online purchase items;

receive a verification message from an employee device, the verification message referencing the verification code; and in response to receiving the verification message, transmit an electronic receipt to the mobile computing device.

13. The system of claim 12, wherein the executable and operational code further comprise executable and operational code effective to cause the one or more processors to:

receive a message from the employee device indicating receiving of the verification code to the employee device;

in response to receiving the message from the employee device indicating input of the verification code to the employee device, transmit a message listing the one or more in-store items.

14. The system of claim 13, wherein the one or more in-store items are a plurality of in-store items; and wherein the executable and operational code further comprise executable and operational code effective to cause the one or more processors to:

identify a portion of the plurality of in-store items, as critical items; transmit the message listing the one or more in-store items in response to receiving the message from the employee device indicating input of the verification code to the employee device further comprises transmitting an ordering of the plurality of in-store items having the critical items listed first.

15. The system of claim 14, wherein the executable and operational code further comprise executable and operational code effective to cause the one or more processors to:

identify the portion of the plurality of in-store items as critical items by identifying the portion as having one of a price above a first threshold, a shrinkage rate above a second threshold, and belonging to a high-theft class of products.

16. The system of claim 12, wherein the executable and operational code further comprise executable and operational code effective to cause the one or more processors to:

evaluate a record associated with the one or more in-store items in database;

determine that the records associated with a portion of the one or more in-store items each have a digital asset associated therewith;

in response to determining that the records associated with the portion of the one or more in-store items each have a digital asset associated therewith, associate authorization to download the digital asset with an account associated with the mobile computing device.

17. The system of claim 16, wherein the portion of the one or more in-store items are media storing content and the digital asset associated with each item of the portion of the in-store items is a digital copy of the content stored on the each item.

18. The system of claim 12, wherein the executable and operational code further comprise executable and operational code effective to cause the one or more processors to:
   receive a desired quantity for a first item of the one or more in-store items from the mobile device
   compare the desired quantity for the first item to an in-stock quantity of the first item;
   determine that the desired quantity exceeds the in-stock quantity of the first item; wherein
   in response to determining that the first desired quantity exceeds the in-stock quantity, generate an online order for a difference quantity of the first item, the difference quantity being equal to a difference between the desired quantity and the in-store quantity; and
   process the single payment of a total of the purchase prices associated with the identifiers by processing payment for the online order for the difference quantity of the first item.

\* \* \* \* \*